(12) United States Patent
Thompson et al.

(10) Patent No.: US 9,379,410 B2
(45) Date of Patent: Jun. 28, 2016

(54) PREVENTING INTERNAL SHORT CIRCUIT IN A LITHIUM-ION BATTERY CELL

(71) Applicant: Dell Products, L.P., Round Rock, TX (US)

(72) Inventors: Richard C. Thompson, Cedar Park, TX (US); Bruce A. Miller, Georgetown, TX (US); Nikhil Manohar Vichare, Austin, TX (US); Maureen Emily Martinez, Round Rock, TX (US); Marc Allan Richmond, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 109 days.

(21) Appl. No.: 14/231,660

(22) Filed: Mar. 31, 2014

(65) Prior Publication Data

US 2015/0280270 A1 Oct. 1, 2015

(51) Int. Cl.
*H01M 2/16* (2006.01)
*H01M 10/0525* (2010.01)
*H01M 4/04* (2006.01)
*H01M 4/139* (2010.01)
*H01M 10/0587* (2010.01)

(52) U.S. Cl.
CPC ............ *H01M 10/0525* (2013.01); *H01M 4/04* (2013.01); *H01M 4/0419* (2013.01); *H01M 4/0435* (2013.01); *H01M 4/139* (2013.01); *H01M 10/0587* (2013.01); *Y02E 60/122* (2013.01); *Y10T 29/49108* (2015.01); *Y10T 29/49115* (2015.01)

(58) Field of Classification Search
CPC ............ H01M 10/052; H01M 2/1673; H01M 10/4235; H01M 4/366; H01M 4/382; H01M 4/0404; H01M 4/04; H01M 4/139; H01M 4/667; H01M 10/0587; H01M 2/145; H01M 2200/00
See application file for complete search history.

(56) References Cited

U.S. PATENT DOCUMENTS

| | | | | |
|---|---|---|---|---|
| 4,195,121 A | * | 3/1980 | Peterson | 429/127 |
| 5,419,982 A | * | 5/1995 | Tura et al. | 429/162 |
| 5,612,153 A | * | 3/1997 | Moulton et al. | 429/304 |
| 6,183,901 B1 | * | 2/2001 | Ying et al. | 429/129 |
| 2002/0197535 A1 | * | 12/2002 | Dudley et al. | 429/246 |
| 2012/0048729 A1 | * | 3/2012 | Mikhaylik et al. | 204/252 |

* cited by examiner

*Primary Examiner* — Patrick Ryan
*Assistant Examiner* — Jose Colucci Rios
(74) *Attorney, Agent, or Firm* — Fogarty, L.L.C.

(57) ABSTRACT

Embodiments of methods for preventing internal short circuits in a lithium-ion battery cell. In an embodiment, a method of manufacturing a lithium-ion battery cell may include providing a cathode, providing an anode, providing a separator disposed between the cathode and the anode, and covering an edge of the cathode to prevent a short between the cathode and the anode through the separator. The method may also include winding the cathode, the anode, and the separator into an electrode roll.

16 Claims, 5 Drawing Sheets

PREVENTING INTERNAL SHORT CIRCUIT IN A LITHIUM-ION BATTERY CELL

FIELD

This disclosure relates generally to batteries, and more specifically, to methods for preventing internal short circuits in a lithium-ion battery cell.

BACKGROUND

Battery safety is an industry priority. A single cell failure may be an ignition source for other cells in the battery pack, and/or surroundings. Preventing or eliminating failure mechanisms in lithium-ion battery design is part of maintaining safety in battery-operated systems.

Standard lithium-ion cell manufacturing processes create an exposed aluminum edge where the cathode master coating roll, sometimes referred to as a jumbo roll, is slit or punched to the dimension of the cell electrode. A cell is assembled with layers of cathode, separator, and anode. In some configurations the layers are wound into rolls, and in other they are stacked. Battery design requires the anode to be larger than the cathode. This creates a pocket in the electrode winding where a particle or contamination can land in, or migrate into.

It is generally not possible to completely avoid contaminants in the process of manufacturing battery cells. Ambient contaminants cannot be completely avoided, and the cell manufacturing process itself often introduces contaminants from machinery wear and tear, etc. Accordingly, lithium-ion battery cells typically include some contaminants. These contaminants are typically in the form of very small particles. The contaminating particles often fall in the pockets between the anode and cathode.

In some cases, the particle may not cause an immediate failure and the cell can pass all testing before leaving the factory. However, the particle may cause a latent defect. For example, when a cell is charged and discharged, the electrodes may swell and compress the pocket. This can cause the particle to puncture a separator which normally separates the anode from the cathode. When the separator is punctured, the particle can create an internal short circuit from the anode active material to the cathode active material, or the anode active material to the cathode current collector. A short between the cathode current collector (aluminum) and anode active material can often be a critical short. A critical short may cause a partial or total failure of the cell, and in some cases may cause an explosion or other undesirable effects.

SUMMARY

Embodiments of methods for preventing internal short circuits in a lithium-ion battery cell are presented. In an embodiment, a method of manufacturing a lithium-ion battery cell may include providing a cathode, providing an anode, providing a separator disposed between the cathode and the anode, and covering an edge of the cathode to prevent a short between the cathode and the anode through the separator. The method may also include winding the cathode, the anode, and the separator into an electrode roll. In still a further embodiment, the method may include stacking the cathode, the anode, and the separator into an electrode stack.

In one embodiment, providing the cathode may include splitting off a portion of a jumbo roll of cathode material. The cathode may include a cathode substrate with a coating disposed adjacent the cathode substrate. In such an embodiment, covering the edge of the cathode comprises covering an edge of the cathode substrate. In one embodiment, covering the edge of the cathode substrate further comprises calendaring the cathode, causing the coating to cover the edge of the cathode substrate. Alternatively, covering the edge of the cathode may include spraying a protective coating on the edge of the cathode. In still another embodiment, covering the edge of the cathode further includes forming a portion of the separator to cover the edge of the cathode.

Additional embodiments of a lithium-ion battery cell are also presented. The lithium-ion battery cell may be manufactured by a process comprising the steps of providing a cathode, providing an anode, providing a separator disposed between the cathode and the anode, and covering an edge of the cathode to prevent a short between the cathode and the anode through the separator.

In one such embodiment, the lithium-ion battery cell may include a cathode, an anode, a separator disposed between the cathode and the anode, and a covering adjacent to an edge of the cathode, the covering configured to prevent a short between the cathode and the anode through the separator.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1A:
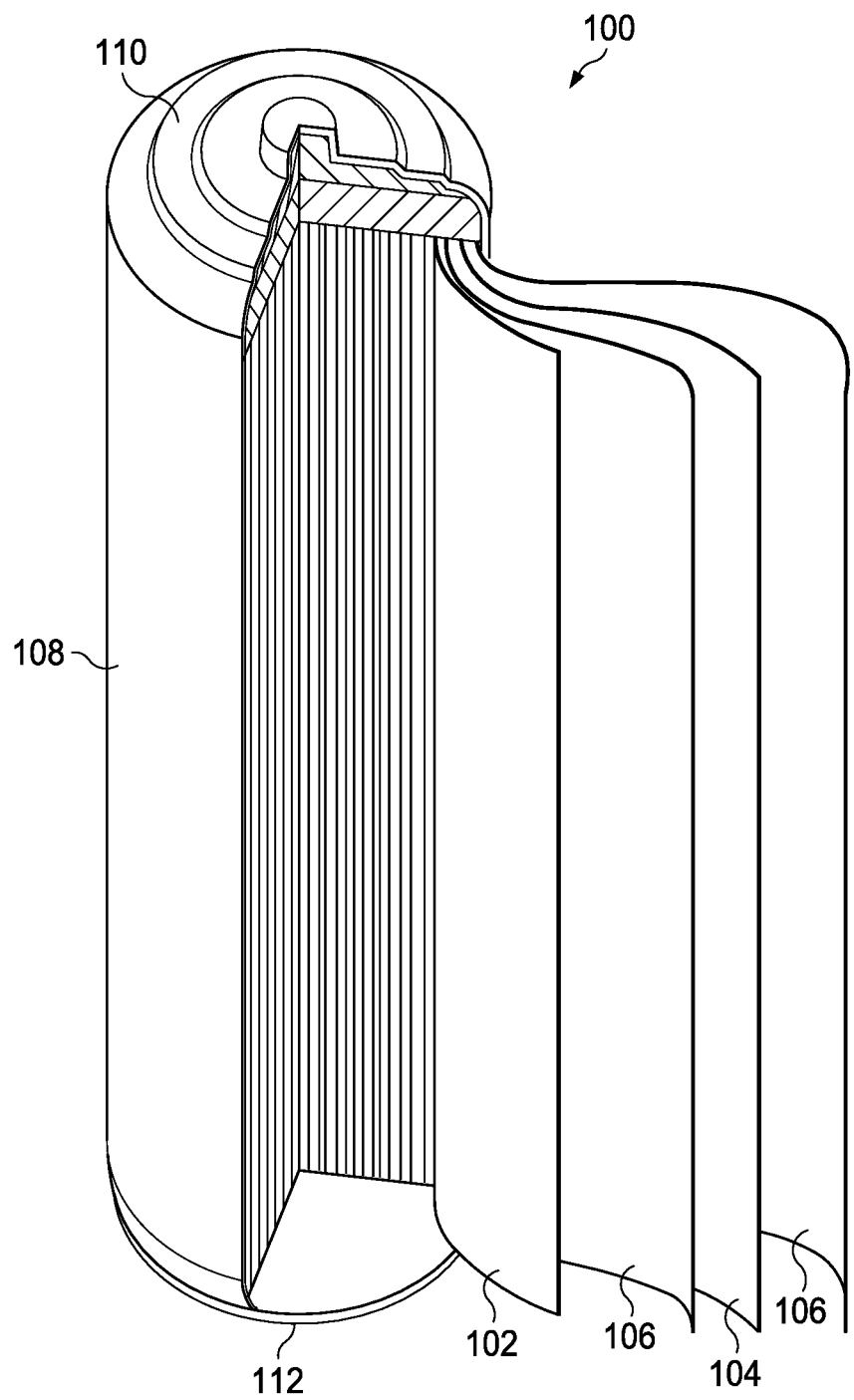
FIG. 1A is a cut-out view diagram illustrating one embodiment of a lithium-ion battery cell
Figure 1B:
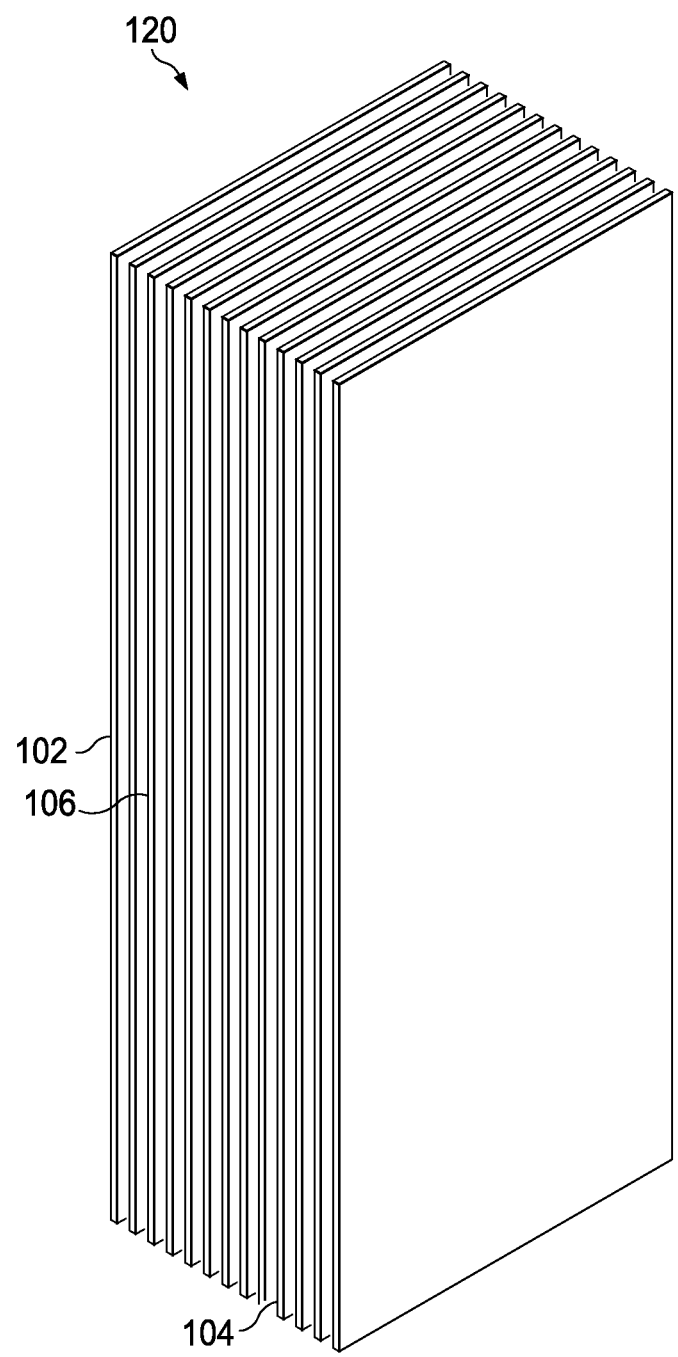
FIG. 1B is a cut-out view diagram illustrating another embodiment of a lithium-ion battery cell.

FIG. 1A is a cut-out view diagram illustrating one embodiment of a lithium-ion battery cell 100. The lithium-ion battery cell 100 may include a cathode 102, an anode 104, and one or more separators 106. The cathode 102, anode 104, and separator(s) 106 may be wound into one or more electrode rolls and housed in a housing 108. In another embodiment, the cathode 102, anode 104, and separator(s) 106 may be stacked into an electrode stack 120 as shown in FIG. 1B. Additionally, a positive terminal 110 and a negative terminal 112 may be positioned on the housing 108. One of ordinary skill will recognize additional components that may be incorporated in a lithium-ion battery cell 100, but those are omitted for the purposes of this disclosure.

Figure 2:
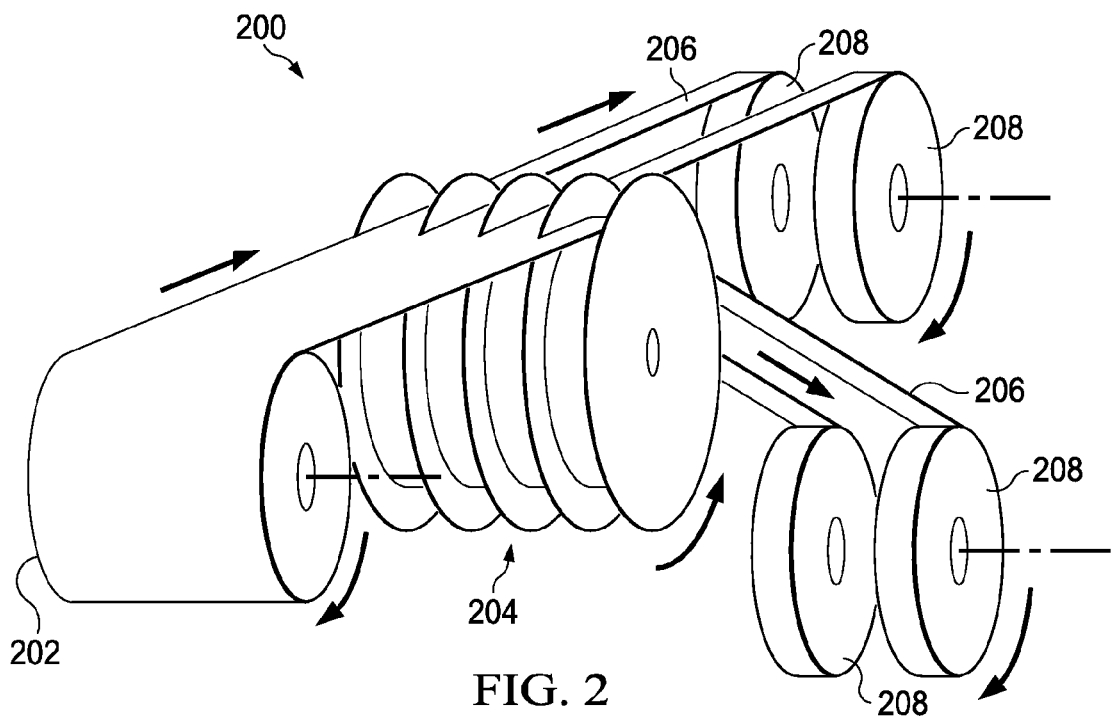
FIG. 2 is a diagram illustrating formation of electrode reels by jumbo roll slitting.

FIG. 2 is a diagram illustrating creation of electrodes by slitting a larger jumbo roll. During the anode and/or cathode manufacturing process, a jumbo roll 202 of electrode material may be formed. In the interest of manufacturing efficiencies, the jumbo roll 202 may be wider than needed for individual battery cells. Illustrated in FIG. 2 is an embodiment of a slitting machine 200. The slitting machine 200 may wind electrode material from the jumbo roll 202 across a set of one or more splitters 204. The splitters 204 may be knives or sharp disks as illustrated in FIG. 2. The splitters may split the electrode material into a plurality of narrower individual electrodes 206. The electrode material 206 may be wound into narrower rolls of electrode material 208. In certain embodiments, the narrower rolls of electrode material 208 may be referred to as an electrode pancake.

During the process of splitting the electrode material, the lateral edges of the electrode substrate may be exposed. For example, the electrode substrate may be exposed along the edge of the strand 206, where the splitters 204 split electrode material from the jumbo roll 202.

Figure 3:
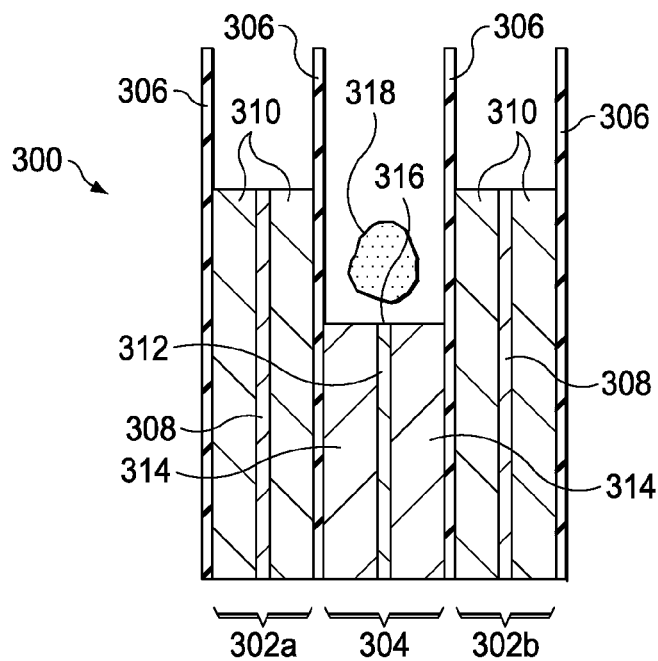
FIG. 3 is a cross-section view diagram illustrating one embodiment of an electrode stack in a lithium-ion battery cell.

FIG. 3 is a cross-section view diagram illustrating one embodiment of an electrode stack 300 in a lithium-ion battery cell 100. In an embodiment, the electrode stack 300 comprises a plurality of electrode layers separated by layers of separator material. For example, in the embodiment illustrated in FIG. 3, the electrode stack 300 includes a first anode 302a, a second anode 302b, and a cathode 304 between the first and second anodes 302a,b. Additionally, the electrode stack 300 includes a plurality of separators 306 positioned to separate the anodes 302a,b from the cathode 304. In a particular embodiment, layers of electrodes similar to this electrode stack 300 may be wound together with the separators 306 into a rolled assembly. Such roles are commonly referred to as "electrode rolls."

In an embodiment, the anodes 302a,b include an anode substrate 308 which is coated with active material 310. Similarly, the cathode 304 may include a cathode substrate 312 which is coated with another active material 314. In an embodiment, the cathode substrate 312 may include aluminum. In an embodiment, the anode substrate 308 may include, for example, copper. In various embodiments, the active materials may include cobalt oxide, manganese oxide, iron phosphate, etc. The separator 306 may include an insulator material, such as polypropylene, polyethylene, etc. One of ordinary skill will recognize various materials which may be used to form a suitable anode 302, a suitable cathode 304, and suitable separators.

In a lithium-ion battery cell, the anodes 302a-b and cathodes 304 are different sizes. For example, the anodes 302a-b is larger than the cathode 304. In such an embodiment, a cavity or gap may be formed over the cathode 304. During the process of manufacturing the lithium-ion battery cell, a contaminant or particle 318 may become caught or lodged in the cavity. During normal operation of the lithium-ion battery cell, the cathode 304 and anode 302 layers may expand and contract. In the process, the contaminant 318 may breach the wall of the separator 306 exposing a portion of the anode 302. Also, an exposed edge 316 of the cathode substrate 312 is often left unprotected during manufacturing processes. If the contaminant 318 simultaneously contacts the exposed edge 316 and breaches the separator, a short between the anode 302 and the cathode 304 may form, which may cause damage to the lithium-ion battery cell. Accordingly, the present embodiments include methods for protecting the exposed edge 316 of the cathode substrate 312 to avoid a short between the anode 302 and the cathode 304 by particle 318.

Figure 4:
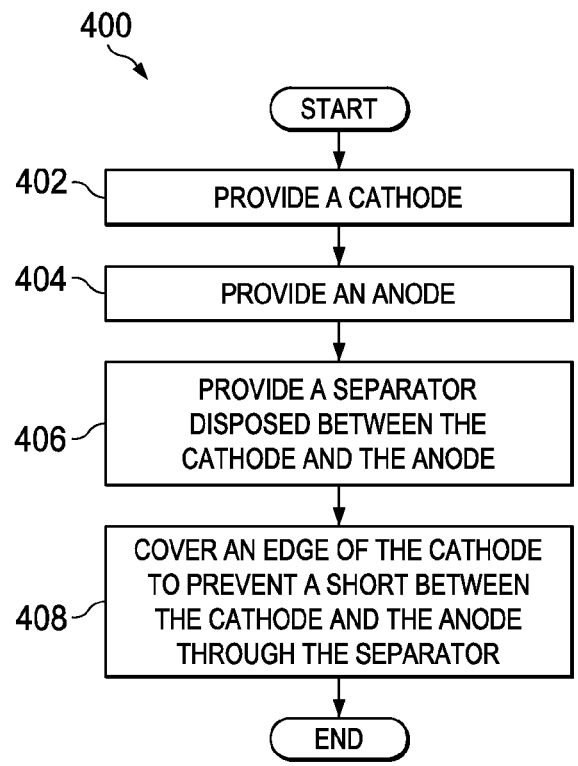
FIG. 4 is a flowchart diagram illustrating one embodiment of a method for preventing internal short circuits in a lithium-ion battery cell.
Figure 6:
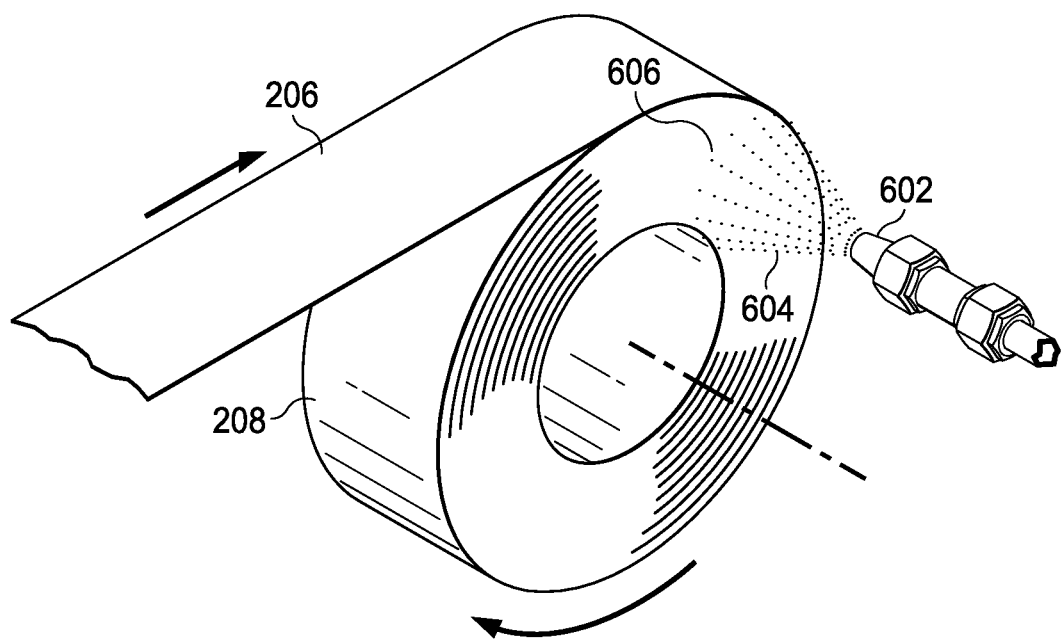
FIG. 6 is a diagram illustrating another embodiment of a method for preventing internal short circuits in a lithium-ion battery cell.
Figure 7:
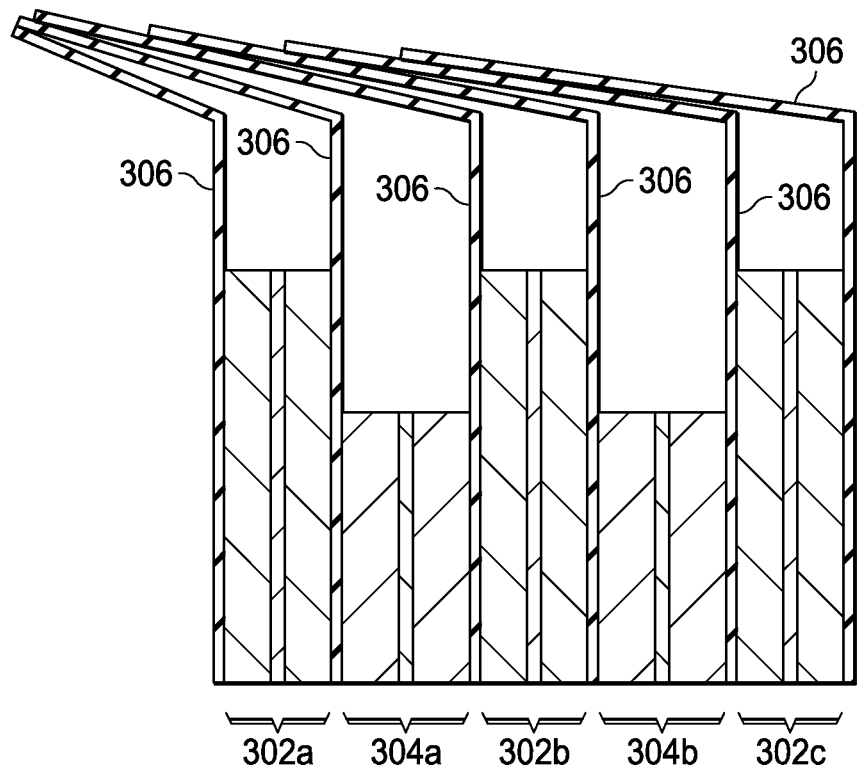
FIG. 7 is a diagram illustrating another embodiment of a method for preventing internal short circuits in a lithium-ion battery cell.

FIG. 4 is a flowchart diagram illustrating one embodiment of a method 400 for preventing internal short circuits in a lithium-ion battery cell. The embodiment of FIG. 4 is a manufacturing process, which includes providing a cathode 304 as shown at block 402 and providing an anode 302 as shown at block 404. The method 400 may also include providing a separator 306 disposed between the cathode 304 and the anode 302 as shown at block 406. In an embodiment, the method 400 also includes covering the exposed edge 316 of the cathode substrate 312 to prevent a short between the cathode 304 and the anode 302 through the separator 306 as shown at block 408. Various embodiments of covering the exposed edge 316 may exist. For illustrative purposes, three embodiments of a method for covering the exposed edge 316 are shown in FIGS. 5-7. One of ordinary skill may recognize additional or alternative embodiments which may be used alone, or in combination with the described embodiments to achieve the same purpose.

Figure 5A:
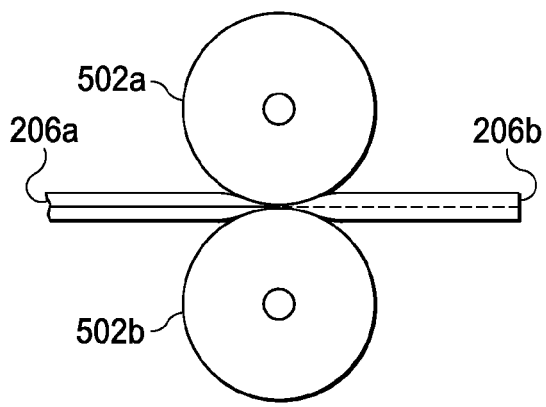
FIG. 5A is a side view diagram illustrating a system configured to perform one embodiment of a preventing internal short circuits in a lithium-ion battery cell.
Figure 5B:
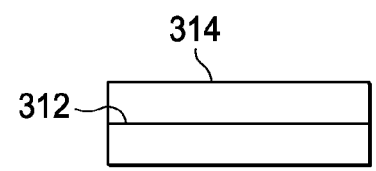
FIG. 5B is a cross-section view diagram illustrating one embodiment of an electrode before performance of the method for preventing internal short circuits in a lithium-ion battery cell.
Figure 5C:
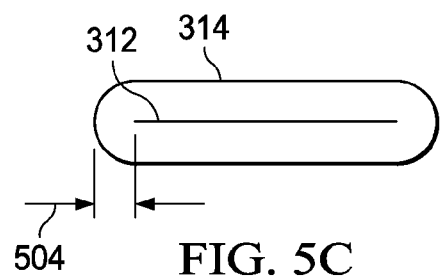
FIG. 5C is a cross-section view diagram illustrating one embodiment of an electrode after performance of the method for preventing internal short circuits in a lithium-ion battery cell.

FIG. 5A is a side view diagram illustrating a system configured to perform one embodiment of preventing internal short circuits in a lithium-ion battery cell. In an embodiment, the final width 206 cathode material 304 may be processed using calendar rollers 502a-b in order to cover the exposed edge 316 of the cathode 304. For example, in portion 206a, the edge of the cathode substrate 312 may be exposed as shown in FIG. 5B. The edge of the coating 314 may be co-planar with the edge of the cathode substrate 312, leaving it exposed. After calendaring by the calendaring rollers 502a-b, the coating 314 may be squeezed or compressed over the edge of the cathode substrate 312 as shown in FIG. 5C. As a result, a margin 504 of coating 314 may be formed over the edge of cathode substrate 312, thereby protecting it from contact with particle 318.

FIG. 6 is a diagram illustrating another embodiment of a method for preventing internal short circuits in a lithium-ion battery cell. As shown in FIG. 2, a jumbo roll 202 may be split into multiple strips 206 and wound onto narrower roll 208. In an embodiment, the method may include applying an insulator coating to the edge 316 of the cathode as it is rolled. For example, system 200 may further include a spray nozzle 602 configured to spray a coating 604 on the edge of the cathode strip 206. The coating may be sprayed before, during, or after winding in various embodiments. In a further embodiment, the protective coating may be applied to a final winding of the anode, cathode, and separator, to an electrode stack, or to a complete cell. In such embodiments, the protective coating may include a similar material as the separator such as polypropylene, polyethylene, etc. One of ordinary skill will recognize alternative or additional materials which may form the protective coating. In further embodiments, the protective coating 604 may be sprayed on a portion of an assembled electrode roll 100 or on a portion of an assembled electrode stack 120 after assembly.

FIG. 7 is a diagram illustrating another embodiment of another method for preventing internal short circuits in a lithium-ion battery cell. In the described embodiment, the separators 306 may be folded over the cathode to close off the gap and prevent the contaminant 318 from entering during the remainder of the manufacturing process. The separators may be folded in any orientation, including from left to right, right to left, etc. Additionally, if a contaminant is already present, the folded separator may provide structural rigidity or support which may help avoid the contaminant puncturing the separator during use.

The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of manufacturing a lithium-ion battery cell, comprising:
   providing a cathode having a first coating layer, a second coating layer, and a substrate between the first and second coating layers, wherein the substrate includes an exposed edge, and wherein the cathode has a given length;
   providing a first anode having a first coating layer, a second coating layer, and a substrate between the first and second coating layers, wherein the first anode has a length greater than the given length;
   providing a first separator disposed between the first coating layer of the cathode and the second coating layer of the first anode;
   providing a second anode having a first coating layer, a second coating layer, and a substrate between the first and second coating layers, wherein the second anode has a length greater than the given length thereby forming a gap between the first and second anodes where the exposed edge of the cathode is located;
   providing a second separator disposed between the second coating layer of the cathode and the first coating layer of the second anode; and
   covering the exposed edge of the cathode during a subsequent manufacturing operation by folding the second separator over edges of both: (a) the cathode's first coating layer, substrate, and second coating layer; and (b) the first anode's first coating layer, substrate, and second coating layer, to prevent a contaminant from entering the gap.

2. The method of claim 1, wherein providing the cathode comprises splitting off a portion of a jumbo roll of cathode material.

3. The method of claim 1, wherein the cathode comprises a cathode substrate with a coating on the cathode substrate.

4. The method of claim 1, wherein covering the exposed edge further comprises calendaring the cathode causing the coating to cover the exposed edge of the cathode substrate.

5. The method of claim 1, wherein covering the exposed edge of the cathode further comprise spraying a protective coating on the exposed edge of the cathode.

6. The method of claim 5, wherein covering the exposed edge of the cathode further comprises:
   rolling the cathode, the anode, the first separator, and the second separator into an electrode roll; and
   spraying the protective coating on a portion of the electrode roll.

7. The method of claim 5, wherein covering the exposed edge of the cathode further comprises:
   stacking the cathode, the anode, the first separator, and the second separator into an electrode stack; and
   spraying the protective coating on a portion of the electrode stack.

8. A lithium-ion battery cell manufactured by a process comprising the steps of:
   providing a cathode having a first coating layer, a second coating layer, and a substrate between the first and second coating layers, wherein the substrate includes an exposed edge, and wherein the cathode has a given length;
   providing a first anode having a first coating layer, a second coating layer, and a substrate between the first and second coating layers, wherein the first anode has a length greater than the given length;
   providing a first separator disposed between the first coating layer of the cathode and the second coating layer of the first anode;
   providing a second anode having a first coating layer, a second coating layer, and a substrate between the first and second coating layers, wherein the second anode has a length greater than the given length thereby forming a gap between the first and second anodes where the exposed edge of the cathode is located;
   providing a second separator disposed between the second coating layer of the cathode and the first coating layer of the second anode; and
   covering the exposed edge of the cathode during a subsequent manufacturing operation by folding the second separator over edges of both: (a) the cathode's first coating layer, substrate, and second coating layer; and (b) the first anode's first coating layer, substrate, and second coating layer, to prevent a contaminant from entering the gap.

9. The lithium-ion battery cell of claim 8, wherein the step of providing the cathode comprises splitting off a portion of a jumbo roll of cathode material.

10. The lithium-ion battery cell of claim 8, wherein the cathode comprises a cathode substrate with a coating disposed adjacent the cathode substrate.

11. The lithium-ion battery cell of claim 10, wherein the step covering the exposed edge of the cathode comprises covering an edge of the cathode substrate.

12. The lithium-ion battery cell of claim 11, wherein the step of covering the exposed edge of the cathode substrate further comprises calendaring the cathode causing the coating to cover the exposed edge of the cathode substrate.

13. The lithium-ion battery cell of claim 8, wherein the step of covering the exposed edge of the cathode further comprise spraying a protective coating on the exposed edge of the cathode.

14. The lithium-ion battery cell of claim 13, wherein the step of covering the exposed edge of the cathode further comprises:
   rolling the cathode, the anode, the first separator, and the second separator into an electrode roll; and
   spraying the protective coating on a portion of the electrode roll.

15. The lithium-ion battery cell of claim 13, wherein the step of covering the exposed edge of the cathode further comprises:
   stacking the cathode, the anode, the first separator, and the second separator into an electrode stack; and
   spraying the protective coating on a portion of the electrode stack.

16. A lithium-ion battery cell, comprising:
   a cathode having a first coating layer, a second coating layer, and a substrate between the first and second coating layers, wherein the substrate includes an exposed edge, and wherein the cathode has a given length;
   a first anode having a first coating layer, a second coating layer, and a substrate between the first and second coating layers, wherein the first anode has a length greater than the given length;
   a first separator disposed between the first coating layer of the cathode and the second coating layer of the first anode;
   a second anode having a first coating layer, a second coating layer, and a substrate between the first and second coating layers, wherein the second anode has a length greater than the given length thereby forming a gap between the first and second anodes where the exposed edge of the cathode is located; and
   a second separator disposed between the second coating layer of the cathode and the first coating layer of the second anode, the second separator is folded over edges of both: (a) the cathode's first coating layer, substrate, and second coating layer; and (b) the first anode's first coating layer, substrate, and second coating layer, to prevent a contaminant from entering the gap and making contact with the exposed edge of the cathode.

* * * * *